May 19, 1970  V. M. HARLAN  3,512,658

POWER-OPERATED, LOAD-CARRYING STAIR-CLIMBING DEVICE

Filed Aug. 15, 1968  2 Sheets-Sheet 1

INVENTOR.
VERLE M. HARLAN
BY William G. Babcock
ATTORNEY

May 19, 1970 — V. M. HARLAN — 3,512,658
POWER-OPERATED, LOAD-CARRYING STAIR-CLIMBING DEVICE
Filed Aug. 15, 1968 — 2 Sheets-Sheet 2
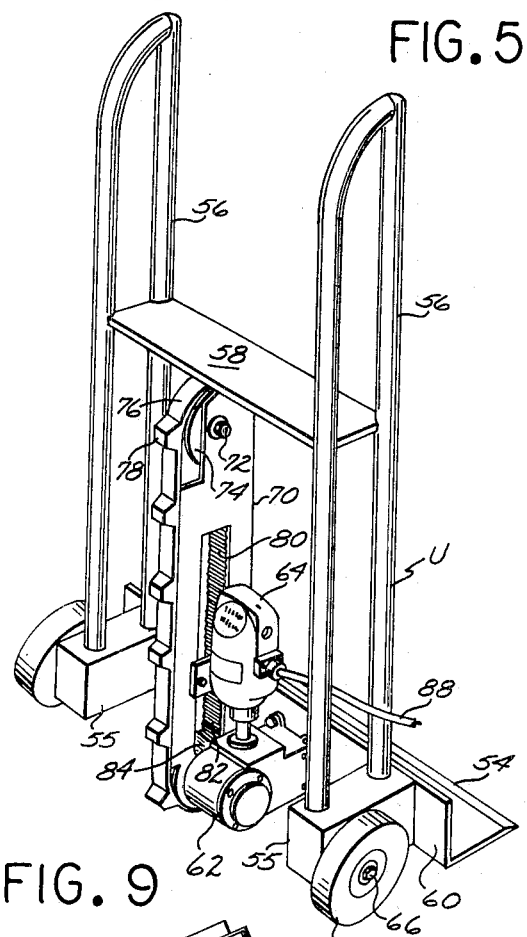
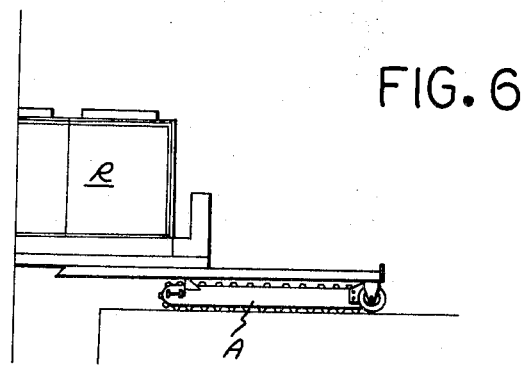
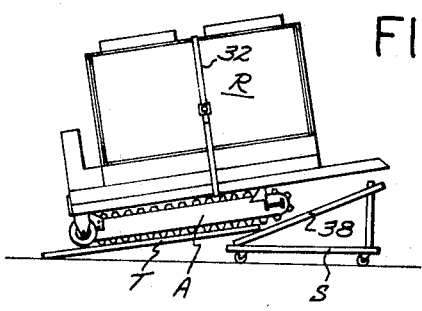
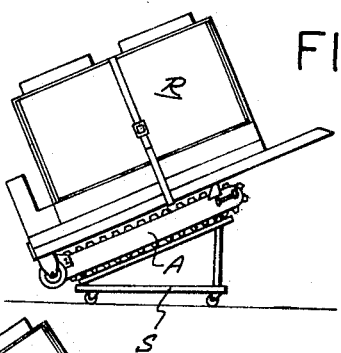
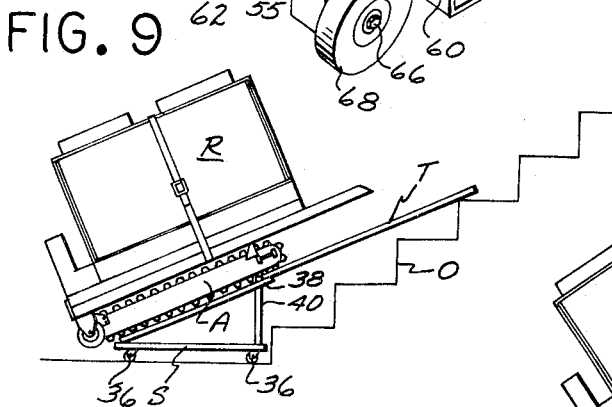
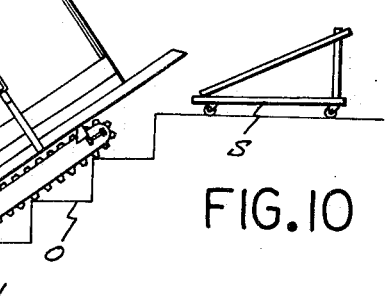
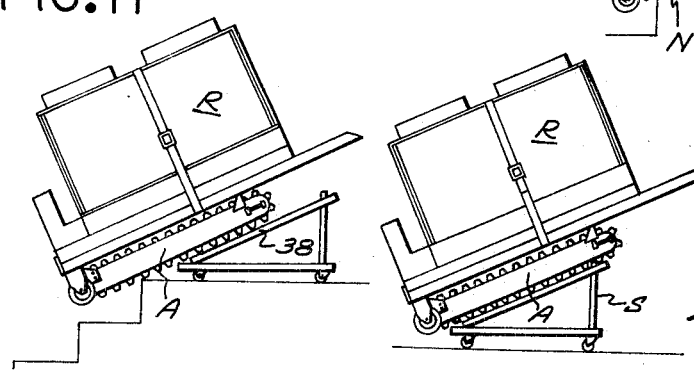
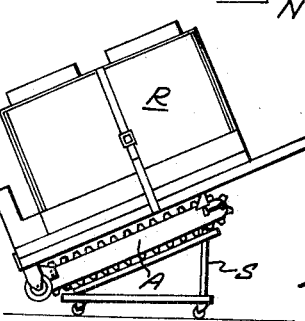
INVENTOR.
VERLE M. HARLAN
BY William C. Babcock
ATTORNEY

United States Patent Office 3,512,658
Patented May 19, 1970

3,512,658
POWER-OPERATED, LOAD-CARRYING
STAIR-CLIMBING DEVICE
Verle M. Harlan, 10462 Ferina,
Bellflower, Calif. 90706
Filed Aug. 15, 1968, Ser. No. 752,973
Int. Cl. B60p 9/00; B62d 55/02
U.S. Cl. 214—1                                   10 Claims

ABSTRACT OF THE DISCLOSURE

A load-carrying, power-operated device that may move upwardly or downwardly on a flight of stairs by means of at least one endless belt from which a plurality of transverse, longitudinally spaced lugs project outwardly, to removably engage the stairs as the device moves upwardly or downwardly thereon. The device of the present invention in combination with a dolly provided with an angularly disposed platform and an elongate rigid member, is adapted to be placed in a climbing position at the bottom of a flight of stairs. After the device and the load supported thereby have traversed the stairs and reached the top thereof, the device may be caused to again climb upon the dolly whereby the loaded device may be moved on the dolly to a desired location. Thereafter, the load is manually removed from the device and dolly. Also, in combination with the dolly, the device may be positioned at the head of a flight of stairs, descend the same and move a load to the bottom thereof.

BACKGROUND OF THE INVENTION

Field of the invention

The present invention relates to the field of load-carrying equipment of a type that is power-operated, and capable of moving upwardly or downwardly on a flight of stairs.

Description of the prior art

In the past, the moving of heavy, bulky objects such as duplicating machines, sections of computers, and other such objects which cannot sustain shock without substantial damage thereto has presented a major problem to suppliers and manufacturers. This problem of moving such objects upwardly or downwardly over a flight of stairs has become increasingly acute.

While various aids have been devised and proposed as a solution of this problem, in the main, they have proven unsatisfactory. Furthermore, such prior art devices have required a number of men to assist in the moving operation, even when they are used.

The present invention is a compact, power-operated, load-carrying device of simple mechanical structure that overcomes the disadvantages of the prior devices used in the past, and by use thereof only a single man is needed to move a heavy, bulky load up or down a flight of stairs.

SUMMARY OF THE INVENTION

A load-supporting device that includes at least one power-operated belt from which lugs project that permit the device to move upwardly or downwardly on a flight of stairs, The device, in combination with a dolly provided with an inclined platform and an elongate, rigid member, may be placed in a position to climb a flight of stairs, and thereafter moved to a desired position where the load is removed therefrom. The device may also be used to move a load down a flight of stairs by reversing the above procedure.

A major object of the invention is to provide a power-operated device for moving a heavy load up or down a flight of stairs with but a single operator.

Another object of the invention is to provide a load-moving device capable of traversing a flight of stairs that is structurally simple, easy to use, and one that minimizes the possibility of injury to personnel using the same in moving such heavy, cumbersome, yet delicate objects.

Still another object of the present invention is to provide a stair-climbing, load-moving device that will substantially reduce the cost of moving heavy loads up or down a flight of stairs, is easy and safe to use, and may be automatically braked at a fixed position on the stairs in the event of a power failure, or termination of the electrical power by the operator.

BRIEF DESCRIPTION OF THE DRAWING

FIG. 5 is a perspective view of a third form of the device;

FIG. 6 is a side elevational view of the first form of the device receiving a load;

FIG. 7 is a side elevational view of the first form of the device moving upwardly on a supporting member to the inclined platform on a dolly;

FIG. 8 is a side elevational view of the device carrying a load supported on the inclined platform of a dolly;

FIG. 9 is a side elevational view of the device carrying the load mounted on the dolly, prior to the device traveling over the elongate member to a position on the lower portion of a flight of stairs;

FIG. 10 is a side elevational view of the load-carrying device climbing a flight of stairs, and just before it has reached the top thereof;

FIG. 11 is a side elevational view of the load-carrying device after it has traversed a flight of stairs and is climbing onto an inclined platform of a dolly; and FIG. 12 is a side elevational view of the load-carrying device has traversed a flight of stairs, with the load-carrying device and dolly then in positions to permit movement of the load, with the dolly, to its intended destination.

DESCRIPTION OF THE PREFERRED EMBODIMENT

Figure 1:
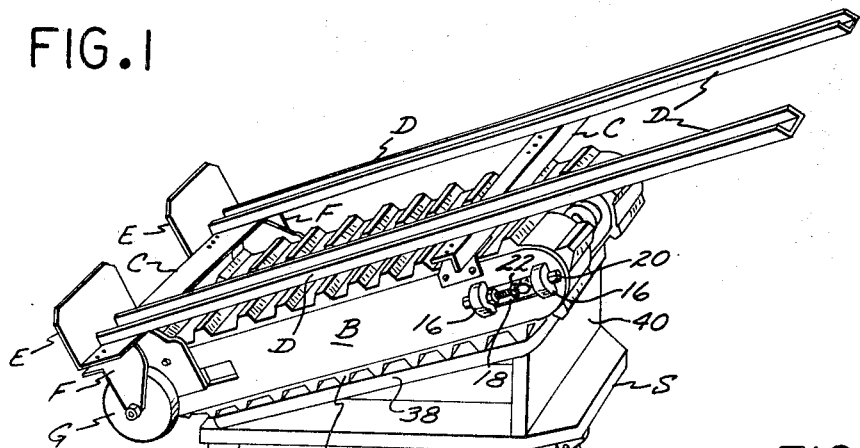
FIG. 1 is a perspective view of the first form of the device mounted on a dolly having an inclined supporting platform.
Figure 2:
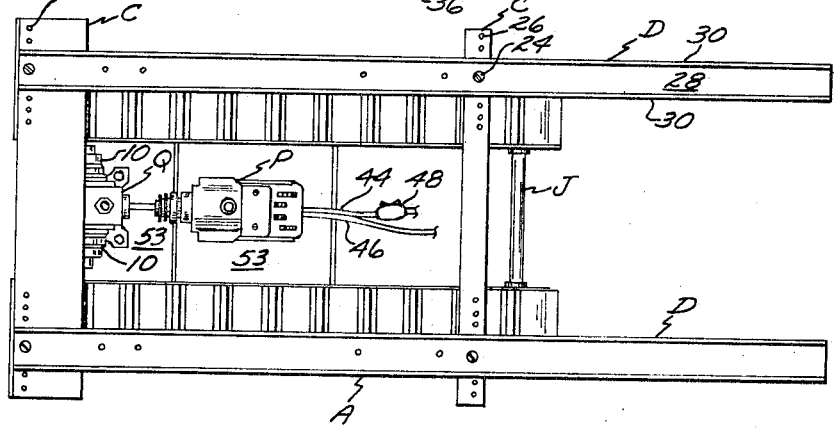
FIG. 2 is a top plan view of the device.
Figure 3:
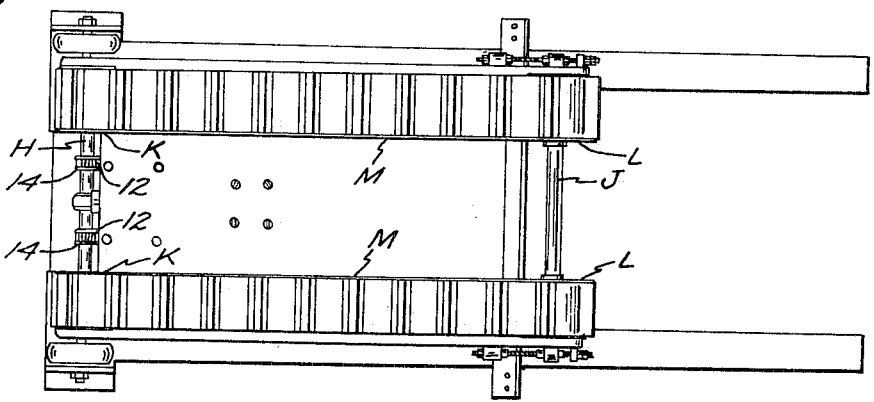
FIG. 3 is a bottom plan view of the first form of the device.

The first form A of the invention is shown in FIGS. 1–3 inclusive, which includes two laterally spaced, parallel side pieces B that are held in fixed laterally spaced relationship by two cross pieces C. Two elongate, laterally spaced, load-supporting members D are adjustably mounted on the cross pieces C, as best shown in FIG. 2. One or more stops E extends upwardly from one of the cross pieces C (FIG. 1), and this same cross piece also supports two laterally spaced brackets F. Each bracket F rotatably supports a wheel G, which permit the first form A of the invention to be easily moved from place to place.

First and second shafts H and J, respectively, extend transversely between the side pieces B, as illustrated in FIG. 3. Two first rollers K are so supported on first shaft H that they are in longitudinal alignment with second rollers L supported from the second shaft J. Two first rollers K are so supported on first shaft H that they are in longitudinal alignment with second rollers L supported from the second shaft J.

Two endless belts M formed from a resilient material such as rubber or other elastomeric material, are rotatably supported in parallel, laterally spaced relationship on the rollers K and L, as shown in FIG. 1 and 3. A number of transverse, longitudinally spaced lugs N extend outwardly from each belt M, which lugs are adapted to engage stairs O, as illustrated in FIG. 10.

A reversible electric motor P is disposed in a fixed relationship between the belts M in the manner shown in FIG. 2, with the drive of the motor being connected to a gear reduction unit Q. The gear-reduction unit Q includes two driving sprockets 10 that are connected by endless link belts 12 to two driven sprockets 14 on first shaft H (FIG. 3). Two longitudinally spaced lugs 16 project outwardly from that end of each side piece B most remote from the wheels G. A slot 18 is formed in each of the side pieces B between the lugs 16.

A bolt 20 extends between each two of the lugs 16 and passes through a diametrically extending opening (not shown) formed in one end of second shaft J. A bolt 20 extends between each two of the lugs 16 and passes through a diametrically extending opening (not shown) formed in one end of the second shaft JJ. Nuts 22 are mounted on bolts 20, which when rotated in an appropriate direction, move shaft J away from shaft H to place tension on the belts M to a desired degree. Bolts or screws 24 extend downwardly through the load-supporting members D (FIG. 2), and are adapted to engage any one of a plurality of spaced openings 26 formed in the cross pieces C to permit desired lateral spacing of the load-supporting members.

The load-supporting members D shown in FIGS. 1 and 2, are preferably formed of channels, each of which includes a web 28 provided with two flanges 30 extending from the longitudinal edges thereof. Shafts H and J are so positioned on the side pieces B that the lower portions of the rollers K and L and the lower portions of the belts M supported thereon are disposed between the lower edges of the side pieces B in the manner shown in FIG. 1.

In FIG. 7 it will be seen that the load R to be transported rests on the load-supporting members D and is removably secured to the first form A of the invention by a strap 32 that engages both the load R and the load-supporting members D.

This first form A of the invention is preferably used with a dolly S, as illustrated in FIG. 1, which dolly includes a base 34 movably supported on a number of casters 36. A platform 38 is supported on the base 34 by an upright 40 at an angle approximately that of the flight of stairs O normally encountered. In addition to the dolly S, the use of a flat rigid member T is required to position the first form A on the flight of stairs O in the manner shown in FIG. 9.

In using the first form A of the invention, the load R is placed on the load-supporting members D (FIG. 6). After the load R has been placed on the first form A of the invention, as illustrated in FIG. 7, it is caused to traverse the length of the member T to position the form A, together with the load R, on the platform 38, as illustrated in FIG. 8. The dolly S and the first form A of the invention are then moved adjacent to the lower step of the flight of stairs O (FIG. 9), with the member T then being disposed between the flight of stairs and the end of the platform 38 most adjacent thereto.

Two electrical conductors 44 and 46 extend from motor P to a source (not shown) of domestic electrical power. The conductor 44 is provided with a normally open electric switch 48, which when closed, causes power to be supplied to the motor P. After the first form A of the invention has been mounted on the dolly S (FIG. 9), the switch 48 is closed to energize motor P. Thereafter, the motor P causes the belts M to rotate, with the belts moving the first form A of the invention across the member T until the lugs N of the belts M are in engagement with the stairs O. The first form A of the invention then moves upwardly on the stairs O in the manner shown in FIG. 10 until it has reached the top thereof, whereupon form A climbs onto the inclined platform 38.

While the first form A of the invention is climbing the flight of stairs O, the dolly S is moved from the position shown in FIG. 9 to that illustrated in FIG. 10 at the head of the stairs. If desired, two dollies S may be provided, with one being left at the foot of the stairs O, and the other dolly positioned at the head of the stairs.

After the first form A of the invention has climbed onto the platform 38 of dolly S, as shown in FIG. 12, the dolly, form A, and load R can be moved to the intended destination on the dolly. Thereafter, the motor P may be reversed by suitable means (not shown) to move the first form A of the invention, together with its load R, from the dolly S.

During the time form A of the invention is moving upwardly over the stairs O, the stops E prevent inadvertent displacement of the load R from the load-supporting members D.

Figure 4:
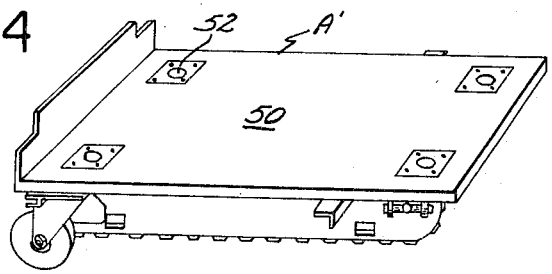
FIG. 4 is a perspective view of a second form of the device.

A second form A' of the inventoin is shown in FIG. 4 that is identical in structure to the first form A thereof, other than that the load-supporting members D are replaced by a platform 50. A number of spaced cavities 52 are formed in platform 50 that are so arranged as to be removably engageable by legs (not shown) which project downwardly from the load R. The cavities 52 must be so arranged as to be adapted to engage the legs on a particular model or piece of equipment (not shown) that is normally handled by form A' of the invention.

The motor P and gear reduction unit Q of both the first form A and second form A' of the invention are secured to plates 53 extending between the side pieces B. The gear ratio of unit Q is such that the unit acts as a brake to prevent downward movement of either the form A or form A' of the invention on the flight of stairs O in the event of a power failure to the motor P or should the operator of the device wish to momentarily terminate the movement of either the first form A or second form A', together with a load R is but partially up the flight of stairs O.

A third form U of the invention is shown in FIG. 5 which includes an L-shaped, load-engaging member 54 that is secured to the forward portions of two laterally spaced blocks 55. Narrow, U-shaped side members 56 extend upwardly from blocks 55, and the upper portions thereof are connected by a transverse cross piece 58. The load-engaging member 54 (FIG. 5) includes a rearwardly disposed, upwardly extending flange 60 from which a gear reduction unit 62 secured thereto extends rearwardly. The unit 62 is driven by an electric motor 64 situated thereabove.

Stub shafts 66 project from the blocks 55 that rotatably support wheels 68. An elongate member 70 extends upwardly from gear reduction unit 62 to cross piece 58, and is situated between the side pieces 56. Near the top of member 70 a stub shaft 72 projects outwardly that supports a roller 74. Roller 74 engages an elongate, endless, resilient belt 76 from which lugs 78 extend outwardly in longitudinally spaced relationship. The interior surface of belt 76 is provided with longitudinally spaced, transversely extending corrugations 80 which engage teeth 82 defined on a drive roller 84 that is driven by the gear reduction unit 62.

A stretch of the belt 76 and the lugs 78 associated therewith extend rearwardly from the elongate member 70 to permit the lugs to engage the steps in the flight of stairs O when a load (not shown) rests on the load-supporting member 52 and the forward portions of the side members U. The rear edge of member 70 and the rear extremities of the side members 56 lie in substantially the same transverse plane. The teeth 82 and corrugations 80 assure that no slippage will occur between the belt 76 and the drive roller 84.

The third form U of the invention shown in FIG. 5 is adapted for use in hauling loads (not shown) lighter than the loads R illustrated in FIGS. 6–12. Such lighter loads could be domestic refrigerators, stoves, television sets, or the like. Form U of the invention permits such loads to be easily moved across a flat floor surface, as well as up a flight of stairs, with but one operator conducting the moving operation.

Electrical current is supplied to the motor 64 through a cable 88 that is adapted to be connected to a source (not shown) of domestic power. Flow of electrical power to the motor 64 is controlled by a switch (not shown) in the same manner as in the case of switch 48 that controls the flow of power to the motor P. During operation of form U, it is tilted to permit the rear portions of the side members 56 to rest on the stairs O and the lugs 78 engage the stairs, whereby the loaded form U may move upwardly relative thereto. When the load is being moved down a flight of stairs O, the operation just described is simply reversed, for the motor 64 is of the reversible type.

The interior surface of the belts M used in conjunction with the first form A of the invention is preferably provided with transverse corrugations (not shown), which are of the same type as corrugations 80. Teeth (not shown) are provided on the exterior surface of the rollers K, which engage the corrugations and prevent slippage of the belts M relative to the rollers when the first form A is being used to move a load R up a flight of saids O as shown in FIGS. 9–10.

I claim:
1. In combination with a dolly and an elongate rigid member, a power-operated device for permitting a single individual to move a heavy object up a flight of stairs, with said dolly including a platform disposed at substantially the same angle as said stairs, which device comprises:
   (a) two parallel, laterally spaced side pieces having first and second ends;
   (b) a plurality of spaced cross pieces secured to said side pieces;
   (c) load-supporting means secured to said cross pieces;
   (d) first and second transverse shafts extending between said side pieces and adjacent said first and second ends thereof;
   (e) at least one flat endless belt, from the exterior surface of which a plurality of spaced transverse lugs project;
   (f) roller means on said first and second shafts for supporting said belt longitudinally between said side pieces, with first portions of said roller means and belt being disposed below said side pieces;
   (g) a reversible electric motor situated at a fixed position between said side pieces;
   (h) a gear reduction unit operatively connecting said motor to said first shaft to rotate said belt, with said load being moved up said flight of said stairs after first being placed on said load-supporting means, and thereafter said dolly and elongate members then being positioned at the lower end of said flight of stairs to provide an angular support over which said device and load may move when said motor is energized to drive said belt, with said lugs after said device and load have traversed said angular support, engaging said steps to move said device and load to the top of said stairs, which device and load then climb onto said angularly disposed platform of said dolly, whereupon energization of said motor is terminated and said device and load are wheeled on said dolly to a desired destination where said load is removed from said device; and
   (i) means for selectively energizing said motor.
2. A device as defined in claim 1 wherein the ratio of said gear reduction unit is such that said gear reduction unit acts as a brake for said device when it is disposed on a flight of stairs and the electric current to said motor is terminated.

3. A device as defined in claim 1 wherein said load-supporting means comprise two elongate, laterally spaced members.
4. A device as defined in claim 3 which further includes:
   (i) means for adjustably supporting said elongate members in any one of a plurality of positions on said cross pieces.
5. A device as defined in claim 1 wherein said load-supporting means comprise a platform in which a number of spaced cavities are formed that are adapted to removably receive protuberances on the load supported by said platform.
6. A device as defined in claim 1 wherein said belt is formed with a plurality of transverse corrugations on the interior surface thereof, and said roller means are provided with toothed exterior surfaces which positively engage said corrugations.
7. A device as defined in claim 1 which further includes:
   (i) means for moving at least one of said shafts longitudinally relative to said side pieces to tension said belt to a desired degree.
8. A method of transporting a heavy load up a flight of stairs between lower and upper floors including the steps of:
   (a) providing two laterally spaced endless belts that have a plurality of transversely aligned, longitudinally spaced protuberances extending outwardly therefrom;
   (b) rotatably supporting said belts on a plurality of rigid cylindrical surfaces to provide a plurality of lower reaches of said belts and protuberances that rest on said lower floor;
   (c) disposing said load in a fixed position above said belts;
   (d) driving at least a portion of said cylindrical surfaces to rotate said belts to move said load to a position adjacent the bottom of said stairs where said belts are disposed in a direction normal relative thereto;
   (e) driving said belts to move said cylindrical surfaces and load upwardly over a first inclined surface that spans a lower portion of said stairs;
   (f) continuing to drive said cylindrical surfaces to permit said protuberances to engage said stairs to move said cylindrical surfaces, belts and load upwardly thereon;
   (g) providing a second inclined surface at the top of said stairs that is movably supported on said upper floor;
   (h) driving said cylindrical surfaces, belts and load to move from said stairs onto said second inclined surface;
   (i) terminating the movement of said belts after said belts, cylindrical surfaces, and load have been moved to a desired position on said second inclined surface, moving said inclined surface to a desired position on said upper floor; and
   (j) removing said load from a position above said belts after said desired position is reached on said upper floor.
9. A method as defined in claim 8 which includes the further step of:
   (k) driving said belts in a direction to move said cylindrical surfaces and load downwardly on said second inclined surface onto said second floor prior to removal of said load from a position above said belts at said desired destination.
10. A method of transporting a heavy load down a flight of stairs extending from an upper floor to a lower floor including the steps of:
   (a) providing two laterally spaced endless belts that have a plurality of transversely aligned, longitudinally spaced protuberances extending outwardly therefrom;

(b) rotatably supporting said belts on a plurality of rigid cylindrical surfaces to provide a plurality of lower reaches of said belts and protuberances that rest on said upper floor;

(c) disposing said load in a fixed position above said belts;

(d) driving at least a portion of said cylindrical surfaces to rotate said belts to move said load on said upper floor and dispose said belts at substantially the same angle as that of said stairs;

(e) continuing to drive said cylindrical surfaces at a constant speed to permit said protuberances to engage said stairs and move said load downwardly thereover;

(f) directing said belts, cylindrical surfaces, and load onto a first inclined surface at the foot of said stairs;

(g) directing said belts, cylindrical surfaces, and load from said first inclined surface onto a second inclined surface that is movably supported on said lower floor;

(h) terminating the driving of said cylindrical surfaces after said cylindrical surfaces, belts, and load are supported on said second inclined surface;

(i) moving said second inclined surface, cylindrical surfaces, belts, and load to a predetermined location on said lower floor;

(j) driving said cylindrical surfaces to move said belts and load from said second inclined surface onto said lower floor; and (k) removing said load from said position above said belts and cylindrical surfaces.

References Cited

UNITED STATES PATENTS

| 2,928,501 | 3/1960 | Ramirez | 187—11 |
| 3,092,200 | 6/1963 | Chambers | 180—9.22 |
| 3,330,370 | 7/1967 | Morton | 180—9.22 |

RICHARD J. JOHNSON, Primary Examiner

U.S. Cl. X.R.

180—9.22; 214—152, 500, 515